(12) United States Patent
Kawasumi

(10) Patent No.: US 10,082,731 B2
(45) Date of Patent: Sep. 25, 2018

(54) ILLUMINATION APPARATUS AND PROJECTION DISPLAY APPARATUS USING THE SAME

(71) Applicant: CANON KABUSHIKI KAISHA, Tokyo (JP)

(72) Inventor: Takehito Kawasumi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/487,304

(22) Filed: Apr. 13, 2017

(65) Prior Publication Data

US 2017/0299958 A1 Oct. 19, 2017

(30) Foreign Application Priority Data

Apr. 19, 2016 (JP) .................. 2016-083744

(51) Int. Cl.
*G03B 21/20* (2006.01)
*G03B 33/12* (2006.01)
(Continued)

(52) U.S. Cl.
CPC ............ *G03B 33/12* (2013.01); *F21V 7/0083* (2013.01); *F21V 7/06* (2013.01); *F21V 9/16* (2013.01); *F21V 9/30* (2018.02); *G02B 27/126* (2013.01); *G02B 27/141* (2013.01); *G02B 27/283* (2013.01); *G03B 21/005* (2013.01); *G03B 21/006* (2013.01); *G03B 21/008* (2013.01);
(Continued)

(58) Field of Classification Search
CPC . F21V 7/0083; F21V 7/06; F21V 9/16; G02B 27/126; G02B 27/141; G02B 27/283; G03B 21/005; G03B 21/006; G03B 21/008; G03B 21/2013; G03B 21/204; G03B 21/2066; G03B 21/208; G03B 33/12; H04N 9/3152; H04N 9/3161; H04N 9/3164
See application file for complete search history.

(56) References Cited

U.S. PATENT DOCUMENTS 6,222,674 B1  4/2001 Ohta
8,894,213 B2  11/2014 Sugiyama et al.
(Continued)

FOREIGN PATENT DOCUMENTS

EP  2287663 A1  2/2011
EP  2458437 A1  5/2012
WO  2011/118536 A1  9/2011

*Primary Examiner* — Sultan Chowdhury
*Assistant Examiner* — Magda Cruz
(74) *Attorney, Agent, or Firm* — Canon USA, Inc. I.P. Division

(57) ABSTRACT

An illumination apparatus includes an illumination optical system configured to illuminate a light modulation element; a plurality of light source units each including a fluorescent member, at least one light source, and a light-guiding optical system; and an optical-path combining system. A predetermined region in an area where light source images are formed by the illumination optical system using light beams from the optical-path combining system is defined as an effective region, and the number of the light source units is denoted by N. In this case, the light source images and N subregions obtained by dividing the effective region by N along a first side direction of the effective region or a second side direction orthogonal to the first side direction satisfy a predetermined relation.

20 Claims, 13 Drawing Sheets

(51) Int. Cl.
*F21V 9/30* (2018.01)
*F21V 7/00* (2006.01)
*F21V 7/06* (2006.01)
*F21V 9/16* (2006.01)
*G02B 27/12* (2006.01)
*G02B 27/14* (2006.01)
*G02B 27/28* (2006.01)
*G03B 21/00* (2006.01)
*H04N 9/31* (2006.01)

(52) U.S. Cl.
CPC ......... *G03B 21/204* (2013.01); *G03B 21/208* (2013.01); *G03B 21/2013* (2013.01); *G03B 21/2066* (2013.01); *H04N 9/3152* (2013.01); *H04N 9/3161* (2013.01); *H04N 9/3164* (2013.01)

(56) References Cited

U.S. PATENT DOCUMENTS

| | | | |
|---|---|---|---|
| 2010/0007854 A1 | 1/2010 | Tanaka et al. | |
| 2011/0116265 A1 | 5/2011 | Salm | |
| 2012/0026469 A1* | 2/2012 | Akiyama | G02B 27/142 353/20 |
| 2012/0133904 A1 | 5/2012 | Akiyama | |
| 2012/0268503 A1* | 10/2012 | Sugiyama | H04N 9/3161 345/690 |
| 2014/0211170 A1* | 7/2014 | Kitano | G03B 21/204 353/31 |
| 2014/0226132 A1 | 8/2014 | Kawasumi | |
| 2014/0226306 A1* | 8/2014 | Khan | G02B 26/008 362/84 |
| 2016/0091785 A1 | 3/2016 | Inoko et al. | |

* cited by examiner

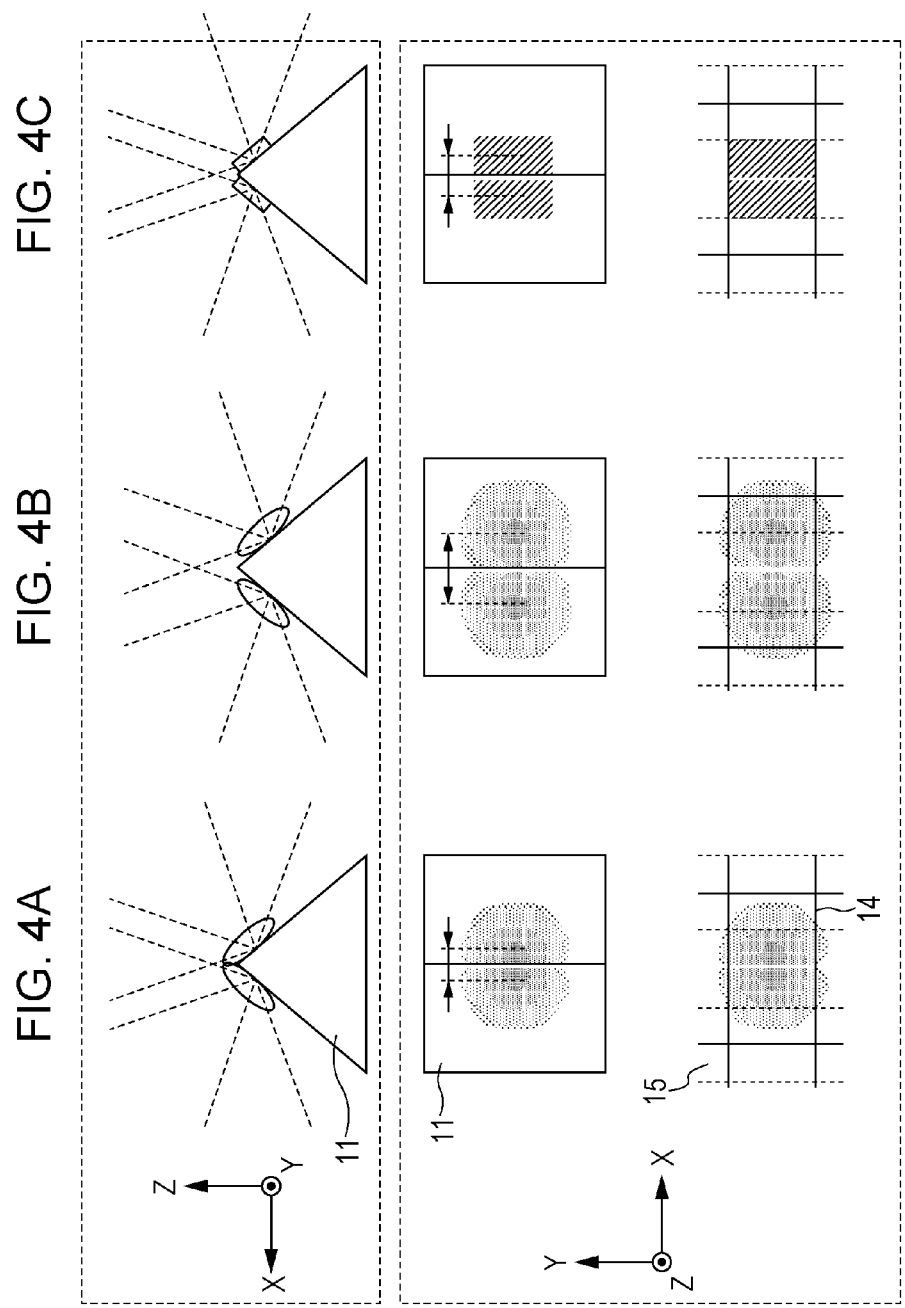

ILLUMINATION APPARATUS AND PROJECTION DISPLAY APPARATUS USING THE SAME

BACKGROUND OF THE INVENTION

Field of the Invention

The present invention relates to an illumination apparatus and a projection display apparatus using the same.

Description of the Related Art

In recent years, so-called solid-state light source projectors have been developed, which are configured to apply light emitted from a laser diode (hereinafter referred to as LD) as exciting light to a fluorescent member and use wavelength-converted fluorescent light as source light. Like projectors of the related art which use a mercury lamp as a light source, the solid-state light source projectors require brightness. As a technique for realizing brighter solid-state light source projectors, a technique described in U.S. Patent Application Publication No. 2014/0211170 is known.

U.S. Patent Application Publication No. 2014/0211170 discloses a configuration which includes two light source units, each including blue LDs and a fluorescent member and capable of emitting a white light beam. The white light beams from the two light source units are combined by a trapezoidal prism pair on the light incident side of a rod integrator, and guided to a light modulation element. With this configuration, a brighter solid-state light source projector is realized. The two light source units are configured such that a light source image, which is an image of a spot on a fluorescent member, is formed near the trapezoidal prism pair.

When the intensity of incident light on the fluorescent member is increased to increase the brightness of the solid-state light source projector, the light density of the spot formed by the incident light on the surface of the fluorescent member is increased. Note that the light density here refers to the intensity of light per unit area. The resulting brightness saturation phenomenon may lower the efficiency of light conversion, and the level of brightness may not increase in proportion to the increase in the output of the LDs.

As a solution to this, U.S. Patent Application Publication No. 2014/0211170 presents a technique that provides a diffusing plate between the LDs and the fluorescent member. This is to blur the spot formed on the surface of the fluorescent member to prevent the light density from becoming too high. When the spot is blurred by using the diffusing plate, the light intensity distribution inside the spot takes the form of a Gaussian distribution where the light intensity decreases from the center toward both ends. Hence, two light source images, each having a light intensity distribution taking the form of a Gaussian distribution, are formed near the trapezoidal prism pair by the two light source units.

The trapezoidal prism pair described in U.S. Patent Application Publication No. 2014/0211170 is formed by two trapezoidal prisms disposed side by side, each having a thickness half the size of the light incident surface of the rod integrator and having a 45-degree reflective surface at an end thereof on the incident side, with their reflective surfaces opposite each other.

When two light source images, each having a light intensity distribution taking the form of a Gaussian distribution, are formed in such an optical-path combining system, a combined light source image obtained by combining the two increases in size. This increases the amount of light not entering the trapezoidal prism pair, and results in low light use efficiency. To reduce the size of the combined light source image, the two light source images may be brought closer to each other until they overlap. However, light in the region where the two light source images overlap enters a reflective surface which is not an originally intended reflective surface, and is guided in a direction different from the direction of the light modulation element. This results in low light use efficiency.

SUMMARY OF THE INVENTION

Accordingly, the present invention provides an illumination apparatus that can reduce a decrease in light use efficiency caused by combining light beams from a plurality of light source units, and also provides a projection display apparatus using the illumination apparatus.

To solve the problems described above, an illumination apparatus according to an embodiment of the present invention includes an illumination optical system configured to illuminate a light modulation element; a plurality of light source units each including a diffusing element, at least one solid-state light source, and a light-guiding optical system configured to guide a light beam from the solid-state light source to the diffusing element; and an optical-path combining system configured to guide light beams from the light source units to the illumination optical system. When a predetermined region in a region where light source images are formed by the illumination optical system using light beams from the optical-path combining system is defined as an effective region and the number of the light source units is denoted by N, the following expression is satisfied: $0.7 \leq X1/Y1 \cdot Y2/X2 \leq 1.3$, where X1 denotes a dimension of each of N subregions in a first side direction of the effective region, the N subregions being obtained by dividing the effective region by N along the first side direction or a second side direction orthogonal to the first side direction, Y1 denotes a dimension of each of the N subregions in the second side direction, X2 denotes a dimension of each light source image in the effective region in the first side direction, and Y2 denotes a dimension of the light source image in the effective region in the second side direction.

Further features of the present invention will become apparent from the following description of exemplary embodiments with reference to the attached drawings.

BRIEF DESCRIPTION OF THE DRAWINGS

FIGS. 4A to 4C illustrate advantageous effects of the present invention over the related art.

DESCRIPTION OF THE EMBODIMENTS

Embodiments of the present invention will now be described in detail on the basis of the attached drawings.

First Embodiment

A configuration of an illumination apparatus and a projection display apparatus according to a first embodiment of the present invention will be described with reference to FIG. 1 to FIGS. 6A and 6B.
(Configuration of Illumination Apparatus and Projection Display Apparatus)

Figure 1:
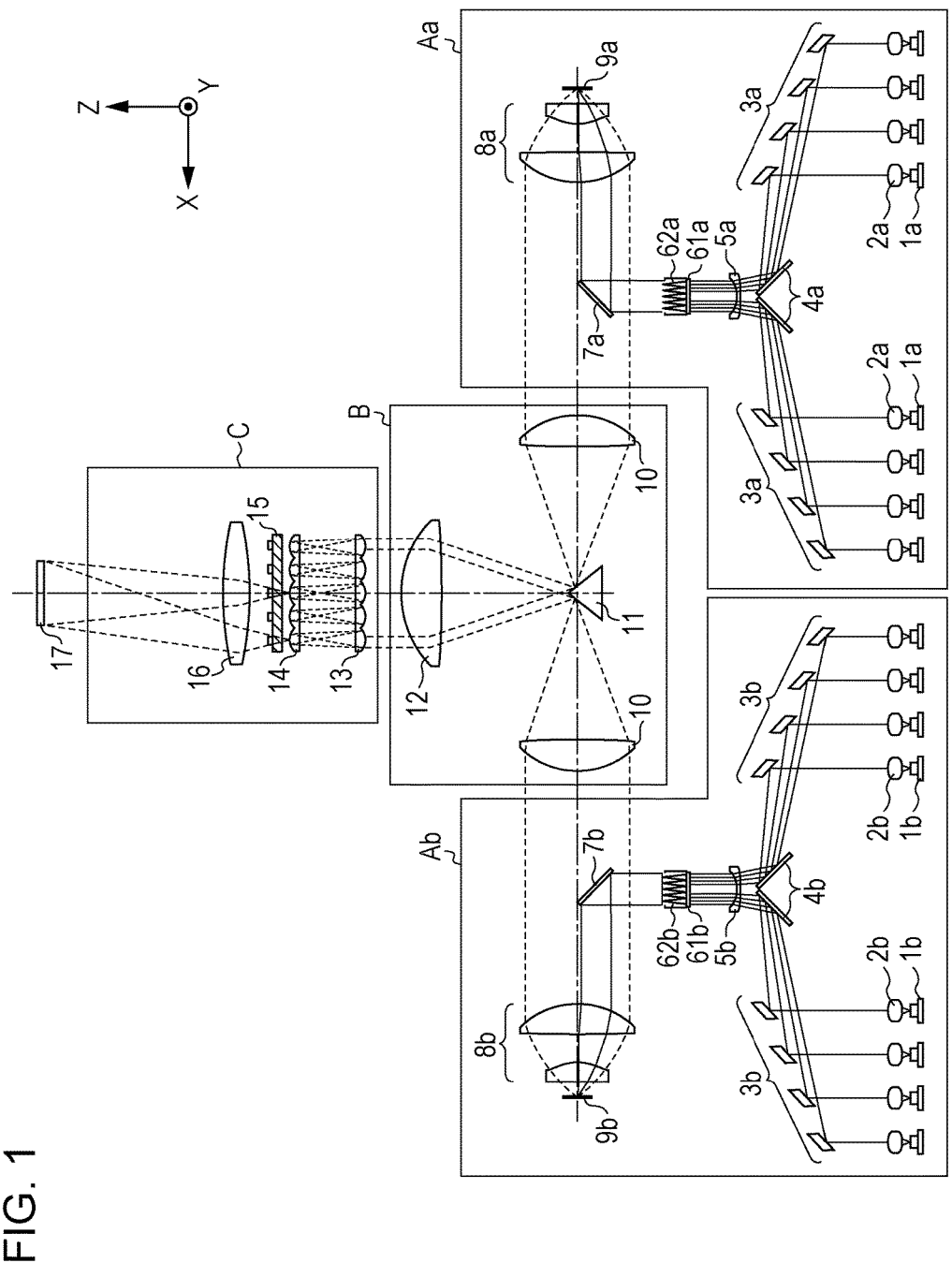
FIG. 1 illustrates a configuration of an illumination apparatus according to a first embodiment.

FIG. 1 illustrates a configuration of an illumination apparatus according to the present embodiment.

In the drawings, a direction parallel to the optical axis of each collimator lens 2 (2a, 2b) described below is defined as a Z-axis direction. A direction orthogonal to the Z-axis direction and determined such that a cross-section parallel to the optical axis of each light collecting lens unit 8 (8a, 8b) described below and the Z-axis direction is an XZ cross-section is defined as an X-axis direction. That is, the optical axis of the collimator lens 2 and the optical axis of the light collecting lens unit 8 do not necessarily need to be orthogonal to each other. A direction orthogonal to the Z-axis direction and the X-axis direction is defined as a Y-axis direction. Note that FIG. 1 shows the XZ cross-section as indicated by the coordinate axes.

Figure 13:
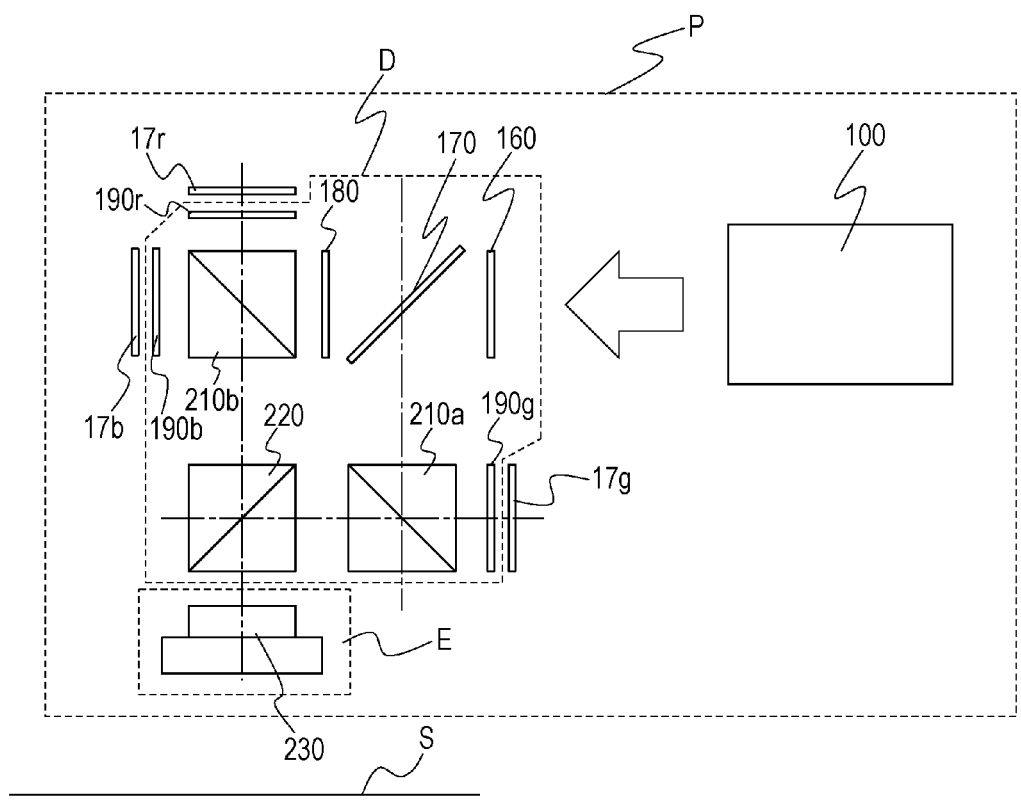
FIG. 13 illustrates a configuration of a projection display apparatus including the illumination apparatus according to any of the embodiments described above.

The illumination apparatus according to the embodiments of the present invention includes a plurality of light source units A including a first light source unit Aa and a second light source unit Ab, an optical-path combining system B including a combining prism 11 (optical-path combining element), and an illumination optical system C. The illumination optical system C is a group of optical elements for illuminating a light modulation element 17. As illustrated in FIG. 13, an apparatus including an illumination apparatus 100 and a color separating-combining system D is referred to as a projection display apparatus.
(Configuration of Light Source Unit)

As illustrated in FIG. 1, each of the light source units A includes light sources 1 (first solid-state light sources 1a, second solid-state light sources 1b), collimator lenses 2 (2a, 2b), parabolic mirror arrays 3 (3a, 3b), flat mirrors 4 (4a, 4b), and a concave lens 5 (5a, 5b). The light source unit A further includes a first lens surface array 61 (a part of a first integrator optical system 61a, a part of a second integrator optical system 61b) and a second lens surface array 62 (a part of the first integrator optical system 62a, a part of the second integrator optical system 62b) configuring an integrator optical system for uniformizing a light intensity distribution in a spot on a fluorescent member 9 (diffusing element) described below. The light source unit A further includes a dichroic mirror 7 (7a, 7b), the light collecting lens unit 8 (8a, 8b), and the fluorescent member 9 (first diffusing element 9a, second diffusing element 9b).

The light source unit A is configured such that fluorescent light (converted light) reflected by the fluorescent member 9 is received and collimated by the light collecting lens unit 8 and output. In the embodiments of the present invention, the collimated light output from the two light source units A (the first light source unit Aa and the second light source unit Ab) enters the optical-path combining system B including convex lenses 10, a combining prism 11, and a collimating lens 12.

The light sources 1 (solid-state light sources) are blue LDs. Divergent light beams from the light sources 1 are turned into collimated light beams by the collimator lenses 2 disposed immediately after the respective light sources 1. That is, one collimator lens 2 is provided for each light source 1, and the number of the collimator lenses 2 is the same as that of the light sources 1. Laser light beams from the collimator lenses 2 travel in the Z-axis direction, and then are reflected and collected by the corresponding parabolic mirror arrays 3.

A plurality of mirrors of each parabolic mirror array (mirror array) 3 form parts of respective parabolic surfaces of different shapes. The laser light beams reflected by the parabolic mirror array 3 are further reflected while being collected by the corresponding flat mirror 4, and then enter the concave lens 5. Since the focal point of the concave lens 5 coincides with the focal point of each mirror of the parabolic mirror array 3, the concave lens 5 outputs collimated light beams. This configuration makes it possible to realize an illumination apparatus smaller in size than in the case of using a single parabolic mirror.

The collimated light beams from the concave lens 5 enter the first lens surface array 61 and are turned into split light beams, which then enter the second lens surface array 62. The split light beams output from the second lens surface array 62 are reflected by the dichroic mirror 7 toward the light collecting lens unit 8. In the embodiments of the present invention, the parabolic mirror arrays 3, the flat mirrors 4, the concave lens 5, the first lens surface array 61, the second lens surface array 62, the dichroic mirror 7, and the light collecting lens unit 8 described above form each of first and second light-guiding optical systems.

The dichroic mirror (second reflective element) 7 has a minimum size necessary to reflect light beams from the second lens surface array 62. The surface of the dichroic mirror 7 is coated with a dielectric multilayer film that reflects light beams from the light sources 1 but transmits fluorescent light from the fluorescent member 9.

The light collecting lens unit 8 (third light-collecting optical system) collects and superimposes the light beams reflected by the dichroic mirror 7 to form a spot on the fluorescent member 9.

The fluorescent member (diffusing element or wavelength conversion element) 9 is positioned such that it is substantially conjugate with a plurality of lens surfaces of the first lens surface array 61, with respect to the second lens surface array 62 and the light collecting lens unit 8. The light beams collimated by the concave lens 5 have a nonuniform light density distribution at the point of entering the first lens surface array 61. However, by being split and superimposed as described above, the light beams form, on the fluorescent member 9, a spot which has a uniform light density distribution and is similar in shape to the lens surfaces of the first lens surface array 61.

That is, an image obtained by superimposing the images of the lens surfaces, each regarded as an object, is formed on the fluorescent member 9. It is thus possible to reduce a decrease in the efficiency of light conversion caused by a brightness saturation phenomenon which occurs when laser light converges to a point on the fluorescent member 9 and leads to forming a distribution with a locally high density of light.

Some of the light beams entering the fluorescent member 9 are converted to fluorescent light primarily of red and green spectra and reflected, whereas the remaining light beams (blue light beams) are reflected without being wavelength-converted. White light beams composed of the reflected light beams of three primary colors (red, green, and blue) are collimated again by the light collecting lens unit 8 and travel toward the optical-path combining system B. The white light beams pass through the dichroic mirror 7, which transmits fluorescent light but reflects blue light having the same wavelength as laser light. This means that of the white light beams, the blue light contained in the light beams passing through the dichroic mirror 7 is returned toward the light sources 1 and this leads to lower light use efficiency.

To reduce a decrease in light use efficiency, it is necessary to minimize the area of the dichroic mirror 7. Specifically, in a direction orthogonal to the optical axis of the light collecting lens unit 8 in a cross-section containing a normal line of the dichroic mirror 7 and the optical axis of the light collecting lens unit 8, the width of the dichroic mirror 7 may be smaller than the width of the light collecting lens unit 8. This configuration makes it possible to realize a light source unit that is compact and lightweight and can reduce a decrease in light use efficiency.

(Configuration of Optical-Path Combining System)

The fluorescent light from the fluorescent member 9 is collected and collimated by the light collecting lens unit 8 and enters the optical-path combining system B. In the optical-path combining system B, the collimated light from each light source unit A is collected by the corresponding convex lens (first light-collecting optical system, second light-collecting optical system) 10 in the vicinity of the vertex of the combining prism (first reflective element) 11. The vicinity of the vertex of the combining prism 11 is positioned to be substantially conjugate with the fluorescent member 9, with respect to the light collecting lens unit 8 and the convex lens 10. Therefore, a light source image similar in shape to the spot formed on the fluorescent member 9 is formed in the vicinity of the vertex of the combining prism 11. Light source images from the two light source units A are positioned close to each other in the vicinity of the vertex of the combining prism 11, and thus may be regarded as a single, combined light source image.

A plurality of light source images may satisfy the following conditions. That is, of a plurality of reflective surfaces of the combining prism 11, one surface adjacent to the first light source unit Aa is defined as a first reflective surface, and another surface adjacent to the second light source unit Ab is defined as a second reflective surface. Also, of the convex lenses 10, one lens that uses light beams from the first light source unit Aa to form a first light source image on the first reflective surface is defined as a first light-collecting optical system, and the other lens that uses light beams from the second light source unit Ab to form a second light source image on the second reflective surface is defined as a second light-collecting optical system.

In this case, as viewed in the direction of the optical axis of the illumination optical system C, at least a region of up to 80% of the maximum intensity in the first light source image may be located on the first reflective surface, and at least a region of up to 80% of the maximum intensity in the second light source image may be located on the second reflective surface. That is, of the light beams from the light source units A, those which fail to enter the first reflective surface and the second reflective surface are preferably as few as possible.

More preferably, the following conditional expression (1) is satisfied:

$$0.7 \leq d1/d2 \leq 1.3 \quad (1)$$

where d1 denotes a distance between centers of the first light source image and the second light source image, and d2 denotes a width of the first light source image in a direction in which the first light source image and the second light source image are arranged. The conditional expression (1) indicates, as illustrated in FIG. 4C (described below), that the first light source image and the second light source image are arranged adjacent to each other, with virtually no space therebetween. Satisfying the conditional expression (1) is preferable in that since the size of the light source images combined by the combining prism 11 can be reduced and the number of light beams blocked by an optical element in a later stage can be reduced, a decrease in light use efficiency can be reduced. It is more preferable to satisfy $0.8 \leq d1/d2 \leq 1.2$ or $0.9 \leq d1/d2 \leq 1.1$.

Light beams reflected by the reflective surfaces of the combining prism 11 are collimated by the collimating lens 12 and enter the illumination optical system C.

(Configuration of Illumination Optical System)

Light entering the illumination optical system C is split by a first fly-eye lens 13 into split light beams, which then form light source images again in the vicinity of a second fly-eye lens 14. The second fly-eye lens 14 is positioned to be substantially conjugate with the vicinity of the vertex of the combining prism 11 in the optical-path combining system B, with respect to the collimating lens 12 and the first fly-eye lens 13. Therefore, the light source images formed in the vicinity of the second fly-eye lens 14 are similar in shape to the light source images formed in the vicinity of the vertex of the combining prism 11.

In summary, the second fly-eye lens 14 is positioned to be substantially conjugate with the fluorescent member 9 and the first lens surface array 61, with respect to the vicinity of the vertex of the combining prism 11. Therefore, the light source images formed in the vicinity of the second fly-eye lens 14 are similar in shape to the lens surfaces of the first lens surface array 61.

The split light beams from the first fly-eye lens 13 pass through the second fly-eye lens 14 and a condenser lens 16 and are collected and superimposed on the light modulation element 17. In the present embodiment, the light modulation element 17 is a liquid crystal panel with an aspect ratio of 16:9, and is configured to form an image by controlling the polarization state of a light beam entering each pixel.

Since the fluorescent light from the light source units A is unpolarized light, the polarization conversion element 15 is disposed immediately after the second fly-eye lens 14 to improve light use efficiency. The polarization conversion element 15 is formed by arranging a plurality of long narrow polarization beam splitters having a width about half that of each lens cell of the second fly-eye lens 14 and then arranging a plurality of half-wave plates on the exit surfaces of alternate polarization beam splitters. The polarization conversion element 15 may be formed by arranging light-shielding portions at positions off the respective half-wave plates described above.

Light entering the polarization conversion element 15 is separated by a polarization separation film into P-polarized light and S-polarized light. The S-polarized light is reflected by an adjacent polarization separation film in the same direction as the P-polarized light, and the P-polarized light is brought into the same polarization state as the S-polarized light by half-wave plates arranged on the exit side of the P-polarized light, whereby the light entering the polarization conversion element 15 is brought into a predetermined state. Alternatively, the S-polarized light may be aligned with the P-polarized light by half-wave plates arranged on the exit side of the S-polarized light. The light beams from the polarization conversion element 15 are guided by the condenser lens 16 to the light modulation element 17.

(Configuration of Color Separating-Combining System)

Light beams from the condenser lens 16 included in the illumination optical system C enter the color separating-combining system D illustrated in FIG. 13.

The color separating-combining system D includes a polarizing plate 160, a dichroic mirror 170, a wavelength-selective phase plate 180, a red λ/4 plate 190*r*, a green λ/4 plate 190*g*, and a blue λ/4 plate 190*b*. The color separating-combining system D further includes a first polarization beam splitter 210*a*, a second polarization beam splitter 210*b*, and a combining prism 220. The red λ/4 plate 190*r*, the green λ/4 plate 190*g*, and the blue λ/4 plate 190*b* will be collectively referred to as a λ/4 plate 190.

The color separating-combining system D configured as described above guides the light beams from the illumination optical system C to light modulation elements for light of different colors (first color light, second color light, and third color light). Specifically, the color separating-combining system D guides the light beams from the illumination optical system C to a red liquid crystal panel 17*r* (first color light modulation element), a green liquid crystal panel 17*g* (second color light modulation element), and a blue liquid crystal panel 17*b* (third color light modulation element). Also, the color separating-combining system D receives the light beams from the red liquid crystal panel 17*r*, the green liquid crystal panel 17*g*, and the blue liquid crystal panel 17*b* and guides them to a projection optical system E described below.

The polarizing plate 160 is a polarizing plate that transmits only light of a predetermined polarization direction aligned by the polarization conversion element 15. The dichroic mirror 170 is configured such that, of the light from the polarizing plate 160, blue light and red light are guided toward the second polarization beam splitter 210*b* and green light is guided toward the first polarization beam splitter 210*a*.

The first polarization beam splitter 210*a* and the second polarization beam splitter 210*b* are configured to guide light from the dichroic mirror 170 to the red liquid crystal panel 17*r*, the green liquid crystal panel 17*g*, and the blue liquid crystal panel 17*b* in accordance with the polarization direction, and also guide light from the red liquid crystal panel 17*r*, the green liquid crystal panel 17*g*, and the blue liquid crystal panel 17*b* to the combining prism 220. The λ/4 plate 190 enhances an analyzer effect by giving a phase difference of λ/2 to reciprocating reflection at the red liquid crystal panel 17*r*, the green liquid crystal panel 17*g*, and the blue liquid crystal panel 17*b*.

The combining prism 220 combines the blue light and the red light from the second polarization beam splitter 210*b* with the green light from the first polarization beam splitter 210*a*, and guides the combined light to the projection optical system E.

(Configuration of Projection Optical System)

The projection optical system E includes a projection lens 230 and guides light from the color separating-combining system D to a projection surface S. The projection lens 230 may be removable from a projection display apparatus P illustrated in FIG. 13, and the projection optical system E may have a shift mechanism that moves the projection lens 230 in a direction orthogonal to the optical axis of the projection lens 230.

With this configuration, the projection display apparatus P can display an image on the projection surface S.

(Description of Effective Region)

In the polarization conversion element 15 described above, when a light beam enters a region different from a region where the polarization direction of light incident on the polarization conversion element 15 is converted to a predetermined polarization direction, the light beam has a polarization direction different from a desired polarization direction. The light beam of this different polarization direction is absorbed or reflected by the polarizing plate 160 and does not enter the red liquid crystal panel 17*r*, the green liquid crystal panel 17*g*, and the blue liquid crystal panel 17*b*, and this leads to low light use efficiency. That is, when a region on the polarization conversion element 15 where a conversion to a desired polarization direction takes place is defined as an effective region, it is desirable that as many light beams as possible pass through the effective region.

Figure 2A:
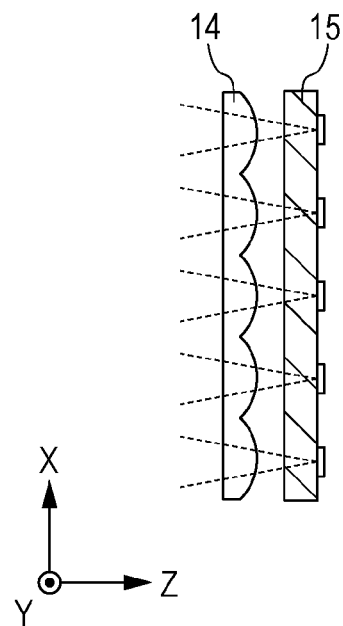
FIGS. 2A and 2B are schematic diagrams illustrating lens cells of a second fly-eye lens and effective regions formed by a polarization conversion element.
Figure 2B:
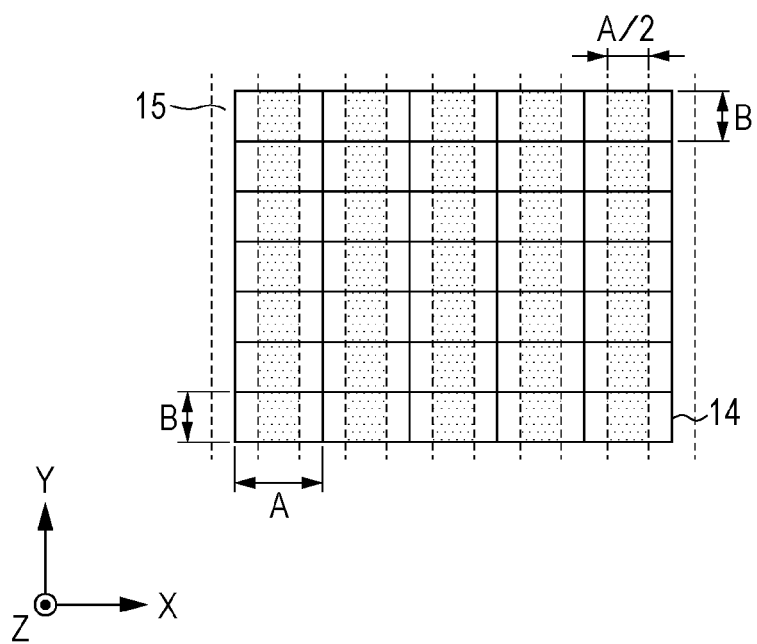

FIGS. 2A and 2B are schematic diagrams illustrating lens cells of the second fly-eye lens 14 and effective regions formed by the polarization conversion element 15 according to the present embodiment. In the present embodiment, as shown in FIG. 2B, the effective regions are regions where the second, fourth, sixth, eighth, and tenth polarization beam splitters (from the left side in FIG. 2B) of the polarization conversion element 15 overlap the respective lens cells of the second fly-eye lens 14.

When, as in the present embodiment, a liquid crystal display element is used as the light modulation element 17 and the illumination optical system C includes the polarization conversion element 15 and the two fly-eye lenses 13 and 14, the aspect ratio of each effective region can be determined as follows.

First, a cross-section parallel to the optical axis of the illumination optical system C and a normal line of the fluorescent member 9 is defined as a first cross-section, and a cross-section parallel to the optical axis of the illumination optical system C and orthogonal to the first cross-section is defined as a second cross-section. Also, the width of the first fly-eye lens 13 and the width of the second fly-eye lens 14 in the first cross-section are denoted by D1x and D2x, respectively, and the width of the first fly-eye lens 13 and the width of the second fly-eye lens 14 in the second cross-section are denoted by D1y and D2y, respectively.

In this case, a compression ratio α in the first cross-section can be expressed as aα=D2x/D1x, and a compression ratio β in the second cross-section can be expressed as β=D2y/D1y. When the width of the light modulation element 17 in the first cross-section is denoted by X' and the width of the light modulation element 17 in the second cross-section is denoted by Y', the aspect ratio of each effective region is (αX'/2)/βY' or αX'/(βY'/2).

In the present embodiment, where D1x=D2x, D1y=D2y, and X':Y'=16:9 and a plurality of lens cells of the first fly-eye lens 13 are similar in shape to the light modulation element 17, D2x(A):D2y(B)=16:9 is satisfied. The aspect ratio of each effective region is A/2:B, and the effective region is a rectangular region with an aspect ratio of 8:9.

Of light source images formed near the effective regions, only components that pass through the effective regions can eventually reach the light modulation element 17. In other words, the effective regions are regions which allow light beams passing therethrough to be guided to the light modulation element 17.

(Relation Between Effective Region and Light Source Image)

Figure 3A:
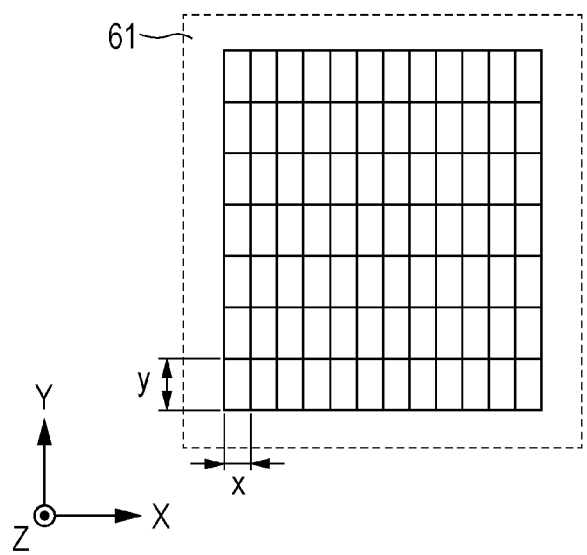
FIGS. 3A to 3C illustrate a geometric relation between an effective region and a light source image according to the first embodiment.
Figure 3B:
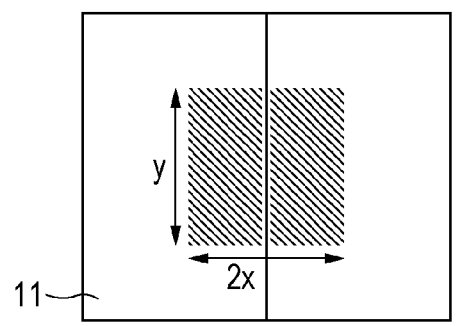
Figure 3C:
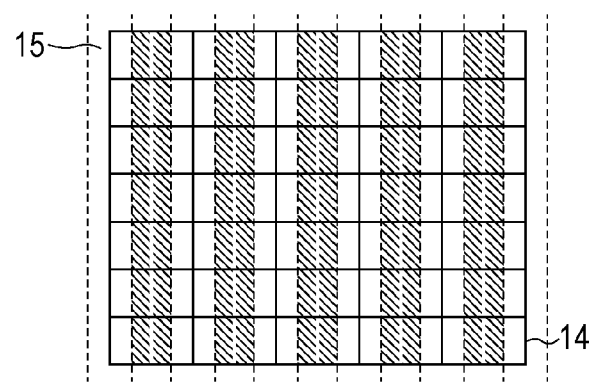

FIGS. 3A to 3C illustrate a geometric relation between an effective region and a light source image according to the present embodiment. FIG. 3A is a front view of the first lens surface array 61 in the present embodiment. The dimension of each of the plurality of lens surfaces (first lens surfaces) of the first lens surface array 61 in the short side direction is denoted by x, and the dimension of this first lens surface in the long side direction is denoted by y. In this case, the aspect ratio of each first lens surface is x:y=4:9 in the present embodiment. As described above, the spot formed on each of the fluorescent members 9a and 9b is similar in shape to the plurality of lens surfaces of the first lens surface array 61. Accordingly, rectangular spots (first and second spots) with an aspect ratio of 4:9 are formed on the respective fluorescent members 9a and 9b.

When these spots are regarded as new light sources, images of the first and second spots can be described as being projected toward the first and second reflective surfaces of the combining prism 11. This produces two adjacent light source images (first and second spot images) with an aspect ratio of 4:9 in the vicinity of the vertex of the combining prism 11. Therefore, as illustrated in FIG. 3B, these two light source images are combined to form a combined light source image having an aspect ratio of 2x:y=8:9 in the vicinity of the vertex of the combining prism 11. In this case, as illustrated in FIG. 3C, each effective region and the combined light source image formed therein are exactly similar in shape. It is thus possible to maximize the illumination efficiency of the illumination optical system C and reduce a decrease in light use efficiency.

As described above, the illumination apparatus of the present embodiment includes a plurality of light source units, in each of which a lens surface array (lens array) having lens surfaces (lens cells) similar in shape to a plurality of subregions obtained by dividing each effective region in the illumination optical system is disposed between the light sources and the fluorescent member. Then, a combined light source image formed in each effective region by combining light beams from these light source units is made similar in shape to the effective region, whereby a decrease in light use efficiency can be reduced.

In other words, when the number of the light source units is denoted by N, N subregions obtained by dividing each effective region by N along a first side direction of the effective region or along a second side direction orthogonal to the first side direction are similar in shape to each light source image in the effective region. The N subregions and the light source image do not necessarily need to be exactly similar in shape. It is only necessary that at least the long side direction of each of the N subregions be parallel to the long side direction of the light source image in the effective region. Note that the light source image in the effective region here refers to an image obtained by perpendicularly projecting the light source image, when the light source image is not formed on any optical element, onto the surface of an optical element in the vicinity of the area where the light source image is formed. As described above, the first spot and the second spot are rectangular spots with an aspect ratio of x:y=4:9. It is only necessary that these rectangular spots be arranged in the short side direction of the rectangles on the reflective surfaces of the combining prism 11 or in the effective region.

The following conditional expression (2) may be satisfied:

$$0.7 \leq \frac{X}{Y} \cdot \frac{y}{x} \leq 1.3 \tag{2}$$

where X denotes the dimension of each of the N subregions in the short side direction, Y denotes the dimension of each of the N subregions in the long side direction, x denotes the dimension of each of the first lens surfaces in the short side direction, and y denotes the dimension of each of the first lens surfaces in the long side direction.

The conditional expression (2) indicates that subregions obtained by dividing each effective region by the number of light source units are substantially similar in shape to each light source image in the effective region. If this condition is satisfied, the level of brightness achieved with two light source units can be 1.4 times that with one light source unit. The lower and upper limits of the conditional expression (2) are more preferably 0.8 and 1.2, respectively, and still more preferably 0.9 and 1.1, respectively.

The conditional expression (2), which uses the dimensions of each first lens surface, may be restated in the following way using the size of each light source image.

That is, the illumination apparatus of the present embodiment includes an illumination optical system configured to illuminate a light modulation element; and a plurality of light source units each including a diffusing element, at least one solid-state light source, and a light-guiding optical system configured to guide a light beam from the solid-state light source to the diffusing element. The illumination apparatus further includes an optical-path combining system configured to guide light beams from the plurality of light source units to the illumination optical system.

Then, when a predetermined region in an area where light source images are formed by the illumination optical system using the light beams from the optical-path combining system is defined as an effective region and the number of the light source units is denoted by N, the following conditional expression (3) is satisfied:

$$0.7 \leq X1/Y1 \cdot Y2/X2 \leq 1.3 \tag{3}$$

where X1 denotes a dimension of each of N subregions in a first side direction of the effective region, the N subregions being obtained by dividing the effective region by N along the first side direction or a second side direction orthogonal to the first side direction, Y1 denotes a dimension of each of the N subregions in the second side direction, X2 denotes a dimension of each light source image in the effective region in the first side direction, and Y2 denotes a dimension of the light source image in the effective region in the second side direction.

One of the first and second side directions may be a short side direction and the other may be a long side direction. That is, if the first side direction is a short side direction, X1 and Y1 in the conditional expression (3) are the same as X and Y, respectively, in the conditional expression (2). If the N subregions obtained by dividing each effective region by N are square in shape, X1 and Y1 have the same length.

The size of each light source image in the first side direction may be the width of a region in the first side direction, the region having an intensity of greater than or equal to 80% of the maximum intensity in the area where the light source image is formed. The intensity in this region may be greater than or equal to 90%, or greater than or equal to 50%, of the maximum intensity. That is, the full width at half maximum, in the first direction, of the intensity distribution in the area where the light source image is formed may be the size of the light source image in the first side direction. The same applied to the size of the light source image in the second side direction.

As in the case of the conditional expression (2), the lower and upper limits of the conditional expression (3) are more preferably 0.8 and 1.2, respectively, and still more preferably 0.9 and 1.1, respectively.

(Comparison with Related Art)

FIGS. 4A to 4C illustrate advantageous effects of the present invention over the related art. In FIGS. 4A to 4C, the upper and middle rows illustrate how light beams and light source images behave on the combining prism 11, and the lower row illustrates a relation between an effective region and light source images in the illumination optical system.

When a spot is formed on the fluorescent member 9 using a diffusing plate as in the related art described above, the spatial distribution of the light density is circular as in FIGS. 4A and 4B and the light density has a nonuniform distribution like a Gaussian distribution. In this case, when light beams from two light source units are combined in the vicinity of the vertex of the combining prism 11, the light source images are spatially widely spread. Therefore, when the centers of the light source images are brought closer to each other as in FIG. 4A, some light beams cannot be reflected by the reflective surfaces of the combining prism 11 or cannot be guided to the illumination optical system. This results in low light use efficiency.

When, as illustrated in FIG. 4B, the centers of the light source images are spaced apart to reduce loss on the combining prism 11, the number of light beams that do not enter the effective region increases and this results in low light use efficiency. In particular, when the light source images are circular in shape and the effective region is a substantially square region with an aspect ratio of 8:9 as in the present embodiment, the combined light source image is longer in the X-direction and this increases the number of light beams that are off the effective region in the X-direction.

Unlike the cases of using a diffusing plate to form a spot on the fluorescent member 9, using a lens surface array as in the present embodiment makes it possible to form a light source image into any shape and to produce a uniform light density distribution of the light source image. With this capability of producing a uniform light density distribution of a light source image, even when light source images from the respective light source units are brought as close as possible in the vicinity of the vertex of the combining prism 11 as in FIG. 4C, it is possible to reduce vignetting in the light source images and loss of light beams. Also, with the capability of forming a light source image into any shape, a combined light source image obtained by combining two light source images can be easily made similar in shape to the effective region in the illumination optical system.

Studies by the present inventors show that when two light source units, each using a diffusing plate (instead of a lens surface array) to form a light source image, were used in the configuration of the present embodiment, the resulting brightness was about 1.3 times that in the case of using one light source unit. The studies also show that when two light source units, each using a lens surface array as in the present embodiment, were used, the resulting brightness was about 1.8 times that in the case of using one light source unit and a significant improvement in illumination efficiency was achieved.

(Configuration of LD)

Figure 5A:
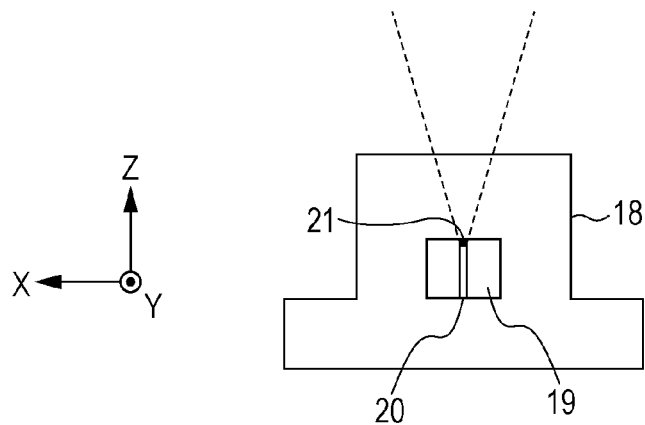
FIGS. 5A to 5C are schematic diagrams of an LD.
Figure 5B:
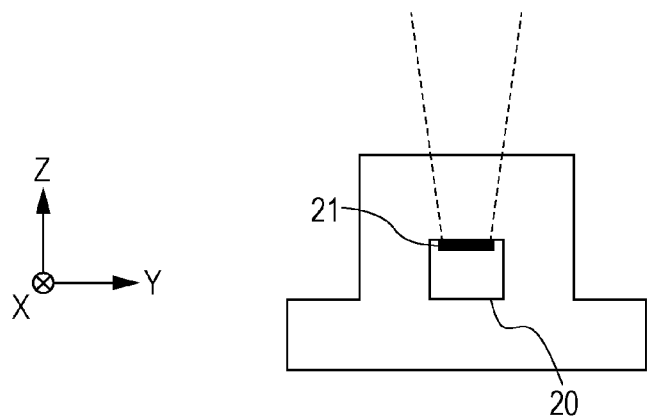
Figure 5C:
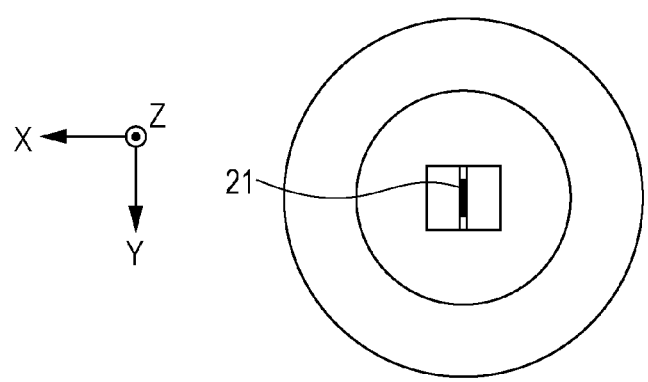

A relation between the lens surface shape of the first lens surface array 61 and a light-emitting surface distribution in each blue LD (light source 1) will now be described. FIGS. 5A to 5C are schematic diagrams illustrating an LD used as the light source 1 in the embodiments of the present invention. FIG. 5A illustrates an internal structure of the LD as viewed in the XZ cross-section, as in FIG. 1.

A package 18 of the LD includes an optical semiconductor having a double heterostructure. The optical semiconductor has a structure in which an active layer 20 is sandwiched between clad layers 19. Application of an electric field to the optical semiconductor activates atoms and causes stimulated emission. Then, light brought into a resonant state in the active layer 20 is emitted from a cleavage plane on a half mirror side. Reference numeral 21 denotes a cleavage plane on the light emitting side. The shape of the cleavage plane 21 represents a light emission distribution of the light source 1. FIG. 5B is a schematic diagram of a YZ cross-section of the same LD. FIG. 5C is a schematic diagram of an XY cross-section of the same LD, as viewed in the Z direction. FIGS. 5B and 5C both indicate that the light-emitting surface distribution in the LD has a long and narrow shape extending in the Y direction.

(Relation Between Shape of Light-Emitting Surface of LD and Lens Surface Array)

Figure 6A:
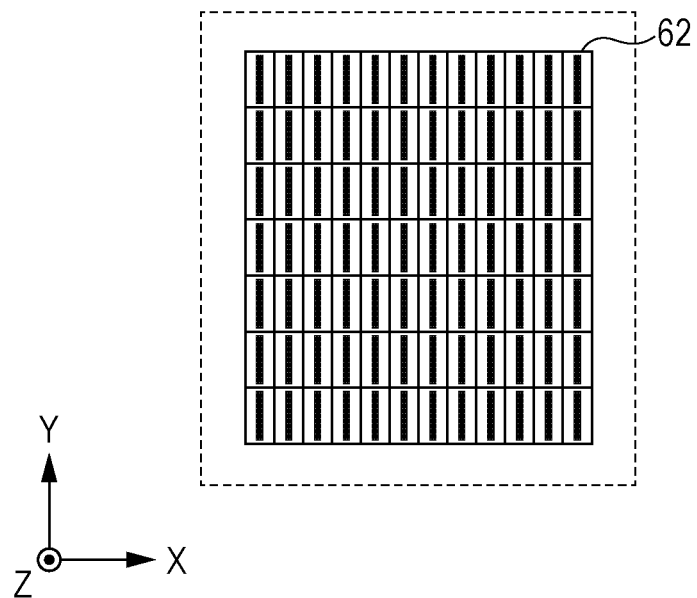
FIGS. 6A and 6B illustrate a relation between the shape of lens surfaces of a second lens surface array and a light-emitting surface distribution in the LD.
Figure 6B:
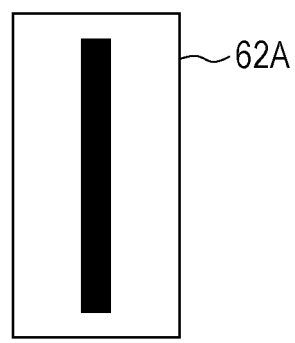

FIGS. 6A and 6B are schematic views illustrating a relation between the shape of lens surfaces of the second lens surface array 62 and the light-emitting surface distribution in the LD serving as the light source 1. Like the first lens surfaces of the first lens surface array 61, lens surfaces (second lens surfaces) 62A of the second lens surface array 62 in the present embodiment are shaped to have an aspect ratio of 4:9.

The collimated light beams split by the first lens surface array 61, as described above, are collected by the first lens surfaces of the first lens surface array 61 onto the corresponding lens surfaces 62A of the second lens surface array 62. The light source image of the light source 1 is thus formed on each lens surface 62A of the second lens surface array 62. If the light source image enters a lens surface different from the corresponding lens surface, the light is wasted and this results in low light use efficiency.

In the present embodiment, as in FIGS. 6A and 6B, the long side direction of the second lens surface is parallel to the long side direction the active layer 20 (the light-emitting surface distribution in the LD) illustrated in FIGS. 5A to 5C. That is, as illustrated in FIG. 6B, the lens surface 62A has a sufficient space for the light source image in both the X and Y directions. With this configuration, for example, even if the light source image is misaligned by variation in the position of the collimator lens 2, the light source image can be easily fitted in a predetermined lens surface and this facilitates reduction of a decrease in light use efficiency.

Second Embodiment

Figure 7:
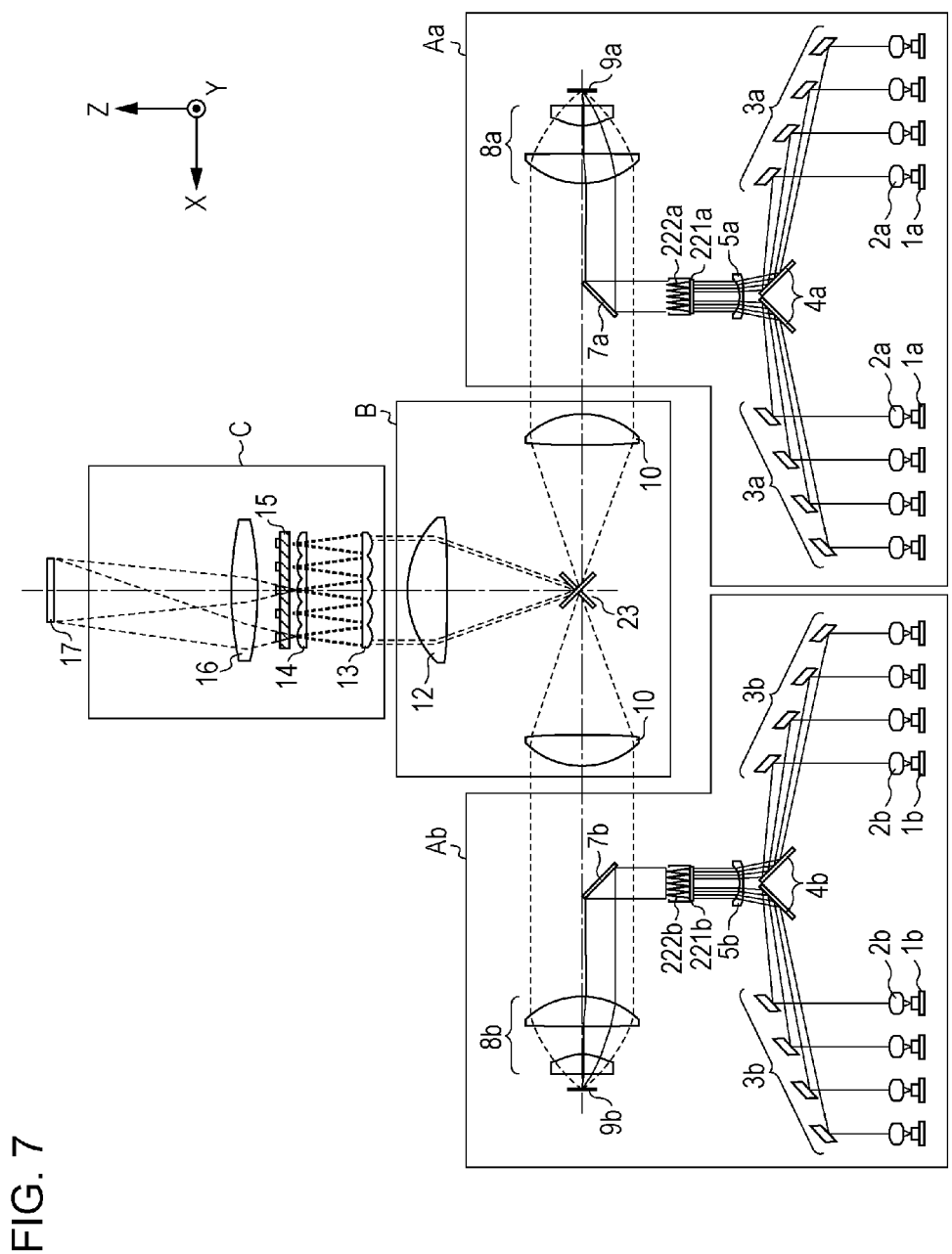
FIG. 7 illustrates a configuration of an illumination apparatus according to a second embodiment.

FIG. 7 illustrates a configuration of an illumination apparatus according to a second embodiment of the present invention. The illumination apparatus of the second embodiment differs from that of the first embodiment in the direction of dividing each effective region in the illumination optical system C and, accordingly, the shape of each lens surface of a first lens surface array 221 (221a, 221b) and a second lens surface array 222 (222a, 222b). Another difference is that the combining prism 11 in the first embodiment is replaced by a combining mirror 23.

In the present embodiment, each effective region in the illumination optical system C also has an aspect ratio of 8:9. In the first embodiment, each effective region is divided into horizontally arranged subregions with an aspect ratio of 4:9, and the first lens surface array 61 has vertically long lens surfaces accordingly. In the present embodiment, on the other hand, each effective region is divided into vertically arranged subregions with an aspect ratio of 8:4.5, and the first lens surface array 221 has horizontally long lens surfaces accordingly. The long side direction of the active layer 20 of each light source 1 is parallel to the Y direction in the first embodiment, but is parallel to the X direction in the present embodiment. The reason for adopting this configuration is the same as that for the first embodiment.

The combining prism 11 cannot be used in the present embodiment where each effective region is divided into subregions arranged in the Y direction, and the combining mirror 23 is used instead. The combining mirror 23 is composed of two mirrors with 45-degree reflective surfaces facing opposite each other and arranged at different positions in the Y direction. With this combining mirror 23, light beams from the two light source units A can be combined in the Y direction. The position of each of the first light source unit Aa and the second light source unit Ab in the Y direction is appropriately adjusted in accordance with the configuration of the combining mirror 23.

Figure 8A:
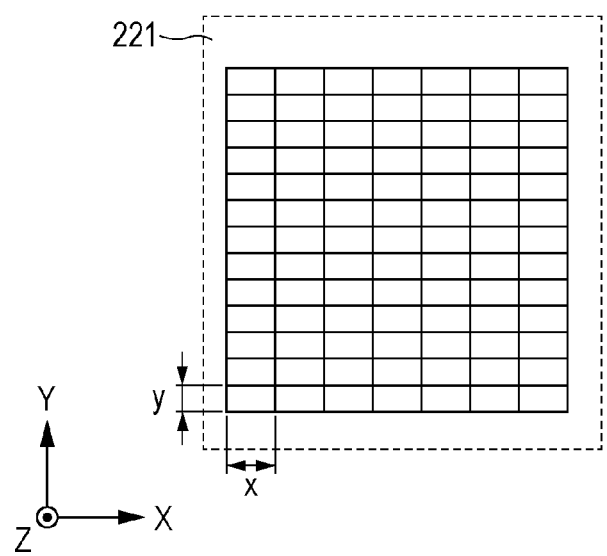
FIGS. 8A to 8C illustrate a geometric relation between an effective region and a light source image according to the second embodiment.
Figure 8B:
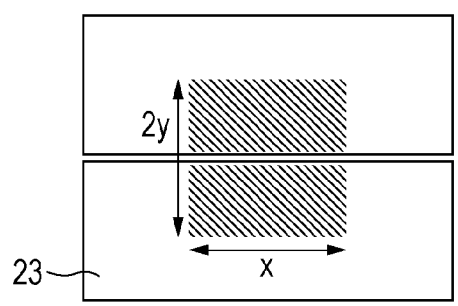
Figure 8C:
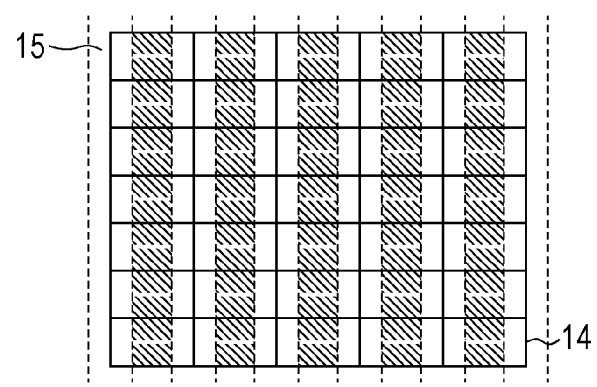

FIGS. 8A to 8C illustrate a geometric relation between an effective region and a light source image according to the present embodiment. FIG. 8A is a front view of the first lens surface array 221 in the present embodiment. Each lens surface of the first lens surface array 221 is a rectangular surface with an aspect ratio of x:y=8:4.5. Accordingly, a spot formed on each fluorescent member 9 and light source images formed on the combining mirror 23 also have a rectangular shape with an aspect ratio of 8:4.5.

The light source images formed by light beams from the two light source units A are positioned as close as possible in the vicinity of the border between the two mirrors of the combining mirror 23. As illustrated in FIG. 8B, the two light source images are thus combined in the Y direction to form a combined light source image having an aspect ratio of x:2y=8:9. In this case, as in FIG. 8C, each effective region in the illumination optical system C and the combined light source image formed therein are exactly similar in shape. It is thus possible to maximize the illumination efficiency of the illumination optical system C. Again, as in the first embodiment, subregions obtained by dividing each effective region and each light source image in the effective region do not necessarily need to be exactly similar in shape in the present embodiment. It is only necessary that at least the long side direction of the subregions obtained by dividing each effective region be parallel to the long side direction of each light source image in the effective region.

In the present embodiment, as in the first embodiment, the illumination apparatus includes a plurality of light source units, in each of which a lens surface array having lens surfaces similar in shape to a plurality of subregions obtained by dividing each effective region in the illumination optical system is disposed between the light sources and the fluorescent member. Then, a combined light source image formed in each effective region by combining light beams from these light source units is eventually made similar in shape to the effective region, whereby a decrease in light use efficiency can be reduced.

Third Embodiment

Figure 9:
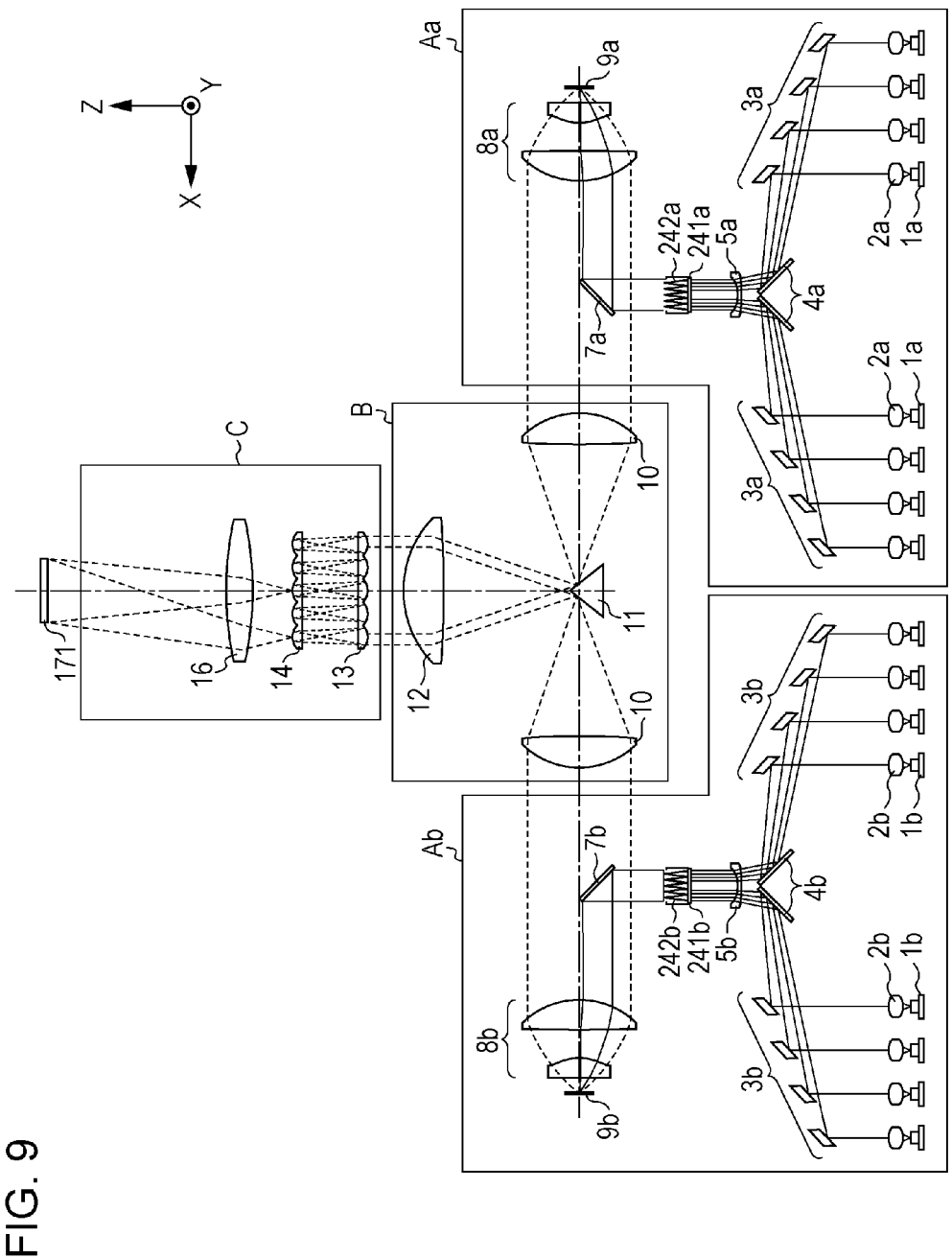
FIG. 9 illustrates a configuration of an illumination apparatus according to a third embodiment.

FIG. 9 illustrates a configuration of an illumination apparatus according to a third embodiment of the present invention. A difference from the first embodiment is that the illumination apparatus of the third embodiment does not include the polarization conversion element 15. Another difference is that instead of using the light modulation element 17, which is a liquid crystal display element, the illumination apparatus of the present embodiment uses a light modulation element 171 which is a micromirror array including a plurality of micromirrors, each having an angle-adjustable reflective surface.

In the present embodiment, the illumination optical system C does not include the polarization conversion element 15, and uses the light modulation element 171 which is a micromirror array. In this case, each effective region in the illumination optical system C is a region on each lens cell of the second fly-eye lens 14. Each lens cell of the second fly-eye lens 14 is similar in shape to the light modulation element 171 and has an aspect ratio of 16:9. Accordingly, the shape of lens surfaces of a first lens surface array 241 (241a, 241b) and a second lens surface array 242 (242a, 242b) is different from that in the first embodiment.

Figure 10A:
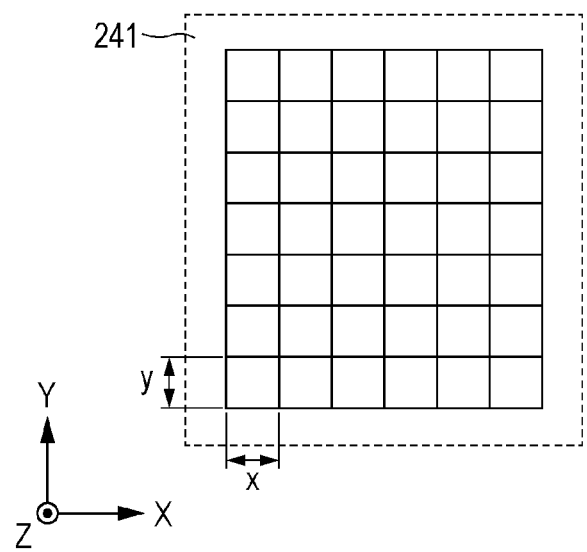
FIGS. 10A to 10C illustrate a geometric relation between an effective region and a light source image according to the third embodiment.
Figure 10B:
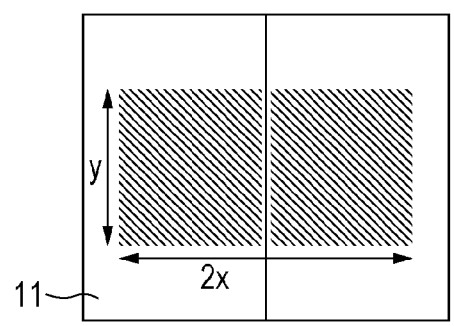
Figure 10C:
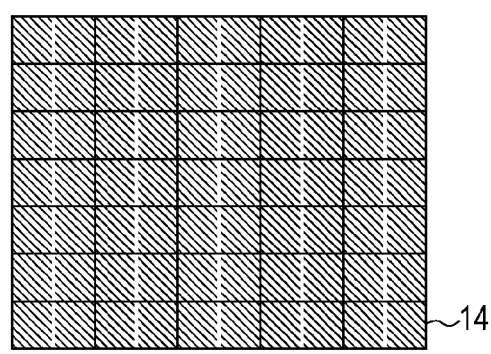

FIGS. 10A to 10C illustrate a geometric relation between an effective region and a light source image according to the present embodiment. FIG. 10A is a front view of the first lens surface array 241 in the present embodiment. Each lens surface of the first lens surface array 241 is a substantially square surface with an aspect ratio of x:y=8:9, where x and y denote horizontal and vertical lengths, respectively. Accordingly, a spot formed on each fluorescent member 9 has a substantially square shape with an aspect ratio of 8:9.

Light source images formed by light beams from the two light source units A are positioned as close as possible in the vicinity of the vertex of the combining prism 11. As illustrated in FIG. 10B, the two light source images are thus combined to form a combined light source image having an aspect ratio of 2x:y=16:9 in the vicinity of the vertex of the combining prism 11. In this case, as in FIG. 10C, each effective region in the illumination optical system C and the combined light source image formed therein are exactly similar in shape. It is thus possible to maximize the illumination efficiency of the illumination optical system C. Again, as in the first embodiment, subregions obtained by dividing each effective region and each light source image in the effective region do not necessarily need to be exactly similar in shape in the present embodiment. It is only necessary that at least the long side direction of the subregions obtained by dividing each effective region be parallel to the long side direction of each light source image in the effective region.

In the present embodiment, as in the first embodiment, the illumination apparatus includes a plurality of light source units, in each of which a lens surface array having lens surfaces similar in shape to a plurality of subregions obtained by dividing each effective region in the illumination optical system is disposed between the light sources and the fluorescent member. Then, a combined light source image formed in each effective region by combining light beams from these light source units is eventually made similar in shape to the effective region, whereby a decrease in light use efficiency can be reduced.

Fourth Embodiment

Figure 11:
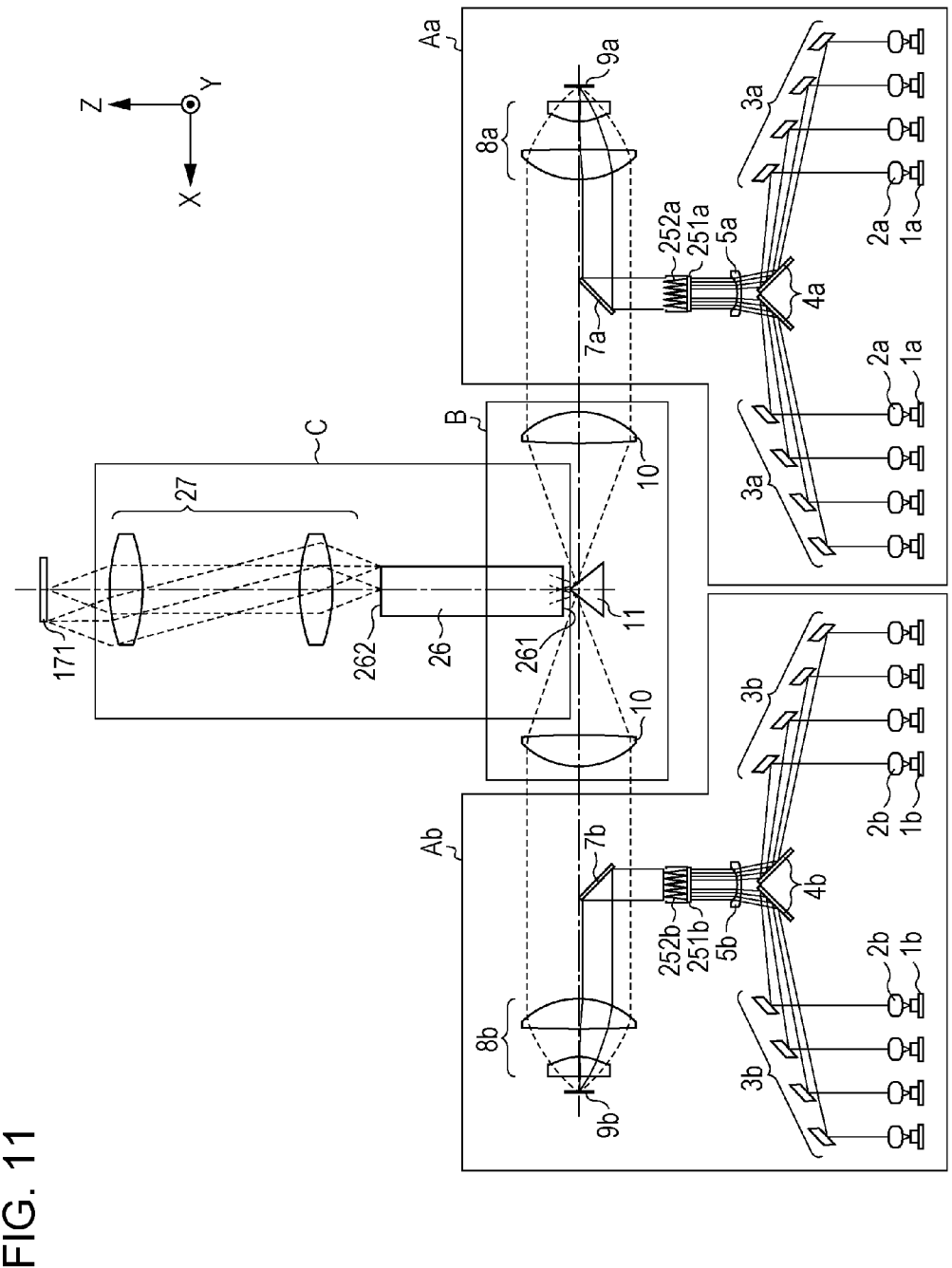
FIG. 11 illustrates a configuration of an illumination apparatus according to a fourth embodiment.

FIG. 11 illustrates a configuration of an illumination apparatus according to a fourth embodiment of the present invention. A difference from the first embodiment is that instead of using the light modulation element 17, which is a liquid crystal display element, the illumination apparatus of the present embodiment uses the light modulation element 171 which is a micromirror array including a plurality of micromirrors, each having an angle-adjustable reflective surface. Accordingly, the shape of lens surfaces of a first lens surface array 251 (251a, 251b) and a second lens surface array 252 (252a, 252b) is different from that in the first embodiment.

In the present embodiment, a rod integrator 26 is disposed immediately after the combining prism 11 of the optical-path combining system B. Therefore, light source images formed by light beams from the two light source units A are formed in the vicinity of the vertex of the combining prism 11 and directly enter a light incident surface 261 of the rod integrator 26. The rod integrator 26 is a prismatic glass element with a rectangular cross-section. Light entering the light incident surface 261 repeats total reflection inside the rod integrator 26 and forms a uniform illuminance distribution on a light exit surface 262. The rod integrator 26 may be a hollow member having a side portion formed by a reflective mirror coated with a dielectric multilayer film or metal film deposited thereon.

Light beams exiting the light exit surface 262 of the rod integrator 26 are projected by a relay lens system 27 onto the light modulation element 171. The light modulation element 171 is a rectangular element with an aspect ratio of 16:9, and the cross-sectional shape of the light incident surface 261 and the light exit surface 262 of the rod integrator 26 is a rectangular shape with an aspect ratio of 16:9 and similar to the shape of the light modulation element 171. In the illumination optical system C which includes the rod integrator 26 as in the present embodiment, an effective region is a region on the light incident surface 261 of the rod integrator 26.

Figure 12A:
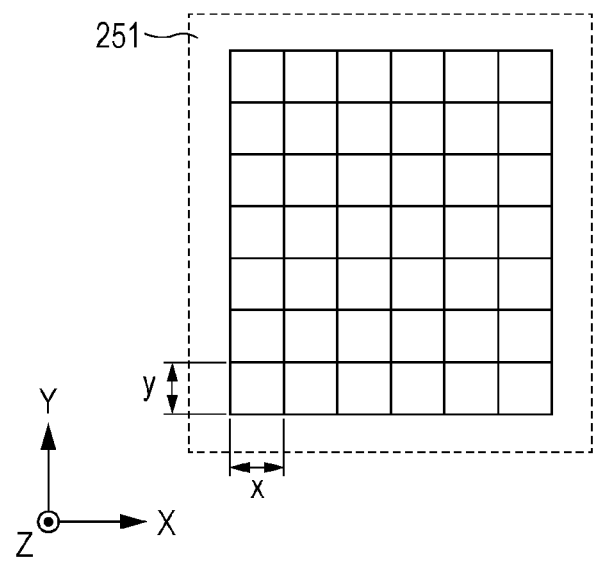
FIGS. 12A to 12C illustrate a geometric relation between an effective region and a light source image according to the fourth embodiment.
Figure 12B:
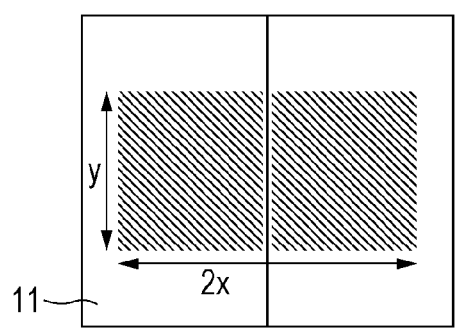
Figure 12C:
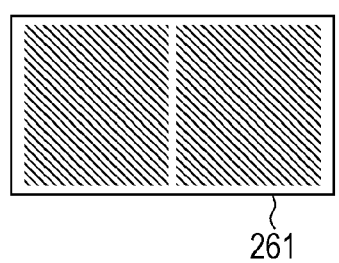

FIGS. 12A to 12C illustrate a geometric relation between an effective region and a light source image according to the present embodiment. FIG. 12A is a front view of the first lens surface array 251 in the present embodiment. Each lens surface of the first lens surface array 251 is a substantially square surface with an aspect ratio of x:y=8:9, where x and y denote horizontal and vertical lengths, respectively. Accordingly, a spot formed on each fluorescent member 9 has a substantially square shape with an aspect ratio of 8:9. Light source images formed by light beams from the two light source units A are positioned as close as possible in the vicinity of the vertex of the combining prism 11. As in FIG. 12B, the two light source images are thus combined to form a combined light source image having an aspect ratio of 2x:y=16:9 in the vicinity of the vertex of the combining prism 11.

In this case, as in FIG. 12C, the effective region in the illumination optical system C and the combined light source image formed therein are exactly similar in shape. It is thus possible to maximize the illumination efficiency of the illumination optical system C. Again, as in the first embodiment, subregions obtained by dividing the effective region and each light source image in the effective region do not necessarily need to be exactly similar in shape in the present embodiment. It is only necessary that at least the long side direction of the subregions obtained by dividing the effective region be parallel to the long side direction of each light source image in the effective region.

In the present embodiment, as in the first embodiment, the illumination apparatus includes a plurality of light source units, in each of which a lens surface array having lens surfaces similar in shape to a plurality of subregions obtained by dividing the effective region in the illumination optical system is disposed between the light sources and the fluorescent member. Then, a combined light source image formed in the effective region by combining light beams from these light source units is eventually made similar in shape to the effective region, whereby a decrease in light use efficiency can be reduced.

The embodiments of the present invention each disclose a configuration of the illumination apparatus in which at least the long side direction of subregions obtained by dividing each effective region by the number of light source units is made the same as the long side direction of each light source image in the effective region, whereby a decrease in light use efficiency can be reduced.

As described above, the position of the effective region varies from one embodiment to another. However, in any of the embodiments, the effective region can be expressed as a predetermined region in an area where light source images are formed. When light source images are formed between optical elements included in the illumination optical system C, the effective region may be defined as follows. That is, a predetermined region on the surface of an optical element in the vicinity of an area where light source images are formed, the optical element being one of those included in the illumination optical system C, may be defined as an effective region. Note that the predetermined region here refers to as a region on which light beams to be guided to the light modulation element are incident.

The optical element in the vicinity of the area where light source images are formed may be the closer of two optical elements between which the area where the light source images are formed is interposed, that is, the optical element closest to the area where the light source images are formed. Alternatively, the effective region may be defined on the other of the two optical elements.

Since light beams incident on the outside of the effective region are not eventually guided to the light modulation element 171, a region on which light beams to be guided to the light modulation element 171 are incident may be defined as an effective region. A region that regulates light beams or light source images from the light sources to prevent unnecessary light beams from being guided to the light modulation element 171 may be defined as an effective region.

Other Embodiments

Embodiments of the present invention have been described above, but the present invention is not limited to the embodiments and can be variously modified and changed within the scope thereof. For example, the number of the light source units A is not limited to two and may be three, four, or more.

An element to which laser light is to be applied through the lens surface arrays is not limited to the fluorescent member 9. For example, when LDs of three colors, red, green, and blue (first solid-state light source, second solid-state light source, and third solid-state light source) are used as light sources, the fluorescent member 9 may be replaced by a diffusing plate to suppress speckle noise. That is, instead of the fluorescent member 9 for conversion of wavelength components, a diffusing plate for conversion of angular components may serve as a light characteristic conversion element that receives laser light. If the fluorescent member 9 is also considered as capable of diffusing incident light, any configuration that allows laser light to be applied to a diffusing element, such as the fluorescent member 9 or diffusing plate, may be used.

In the embodiments described above, blue LDs are used as the light sources 1, and a yellow fluorescent member that emits yellow light using blue light as excitation light is used as the fluorescent member 9. However, the present invention is not limited to this configuration. For example, solid-state light sources each emitting ultraviolet light may be used as the light sources 1, and a fluorescent member that emits blue or yellow light using ultraviolet light as excitation light may be used as the fluorescent member 9.

In the embodiments described above, the lens surfaces of the first lens surface array have the same shape as the lens surfaces of the second lens surface array, but the present invention is not limited to this configuration. For example, the shape of the lens surfaces of the first lens surface array may differ from the shape of the lens surfaces of the second lens surface array.

Although the lens cells of the first fly-eye lens have the same shape as the lens cells of the second fly-eye lens in the first to third embodiments described above, the present invention is not limited to this configuration. For example, the shape of the lens cells of the first fly-eye lens may differ from the shape of the lens cells of the second fly-eye lens, and the aspect ratio of each effective region in this case may be determined using the compression ratios $\alpha$ and $\beta$ as described above.

In the case of using the fly-eye lenses and not using the polarization conversion element, as in the third embodiment, the aspect ratio of each effective region is equal to the aspect ratio of each lens cell of the second fly-eye lens. The aspect ratio of each effective region in this case can be expressed as $\alpha X=/\beta Y'$ using the compression ratios and the aspect ratio of the light modulation element.

In the embodiments described above, the first light source unit Aa and the second light source unit Ab are symmetric with respect to the optical axis of the illumination optical system C. More specifically, in the first light source unit Aa, the fluorescent member 9a is displaced to the right side (upper side on the sheet of FIG. 1) with respect to a center axis of a z-axis direction of the region in which the plurality of light sources 1a are arranged, whereas in the second light source unit Ab, the fluorescent member 9b is displaced to the left side (under side on the sheet of FIG. 1) with respect to a center axis of the z-axis direction of the region in which the plurality of light sources 1b are arranged. Since this creates a space between the dichroic mirrors 7a and 7b, the optical-path combining system B is disposed in this space in the embodiments described above. This can reduce the size of the entire illumination apparatus.

In the embodiments described above, each of the light source units A includes the first lens surface array and the second lens surface array configuring an integrator optical system. Specifically, the first lens surface array and the second lens surface array are configured to form an integral unit as illustrated in the drawings, but they may be configured as separate units as in the case of the first and second fly-eye lenses.

The first and second lens surface arrays may be replaced by a rod integrator serving as an integrator optical system. In this case, since the light exit surface of the rod integrator is similar in shape to the spot on the fluorescent member, it is only necessary that at least the long side direction of the light exit surface of the rod integrator be the same as the long side direction of N subregions.

Instead of using both the first and second fly-eye lenses, only the first fly-eye lens may be used as a fly-eye lens. The first and second fly-eye lenses may be replaced by a pair of cylindrical lens arrays (lenticular lenses) stacked such that the generatrix directions of their cylindrical lens surfaces are orthogonal to each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-083744 filed Apr. 19, 2016, which is hereby incorporated by reference herein in its entirety.

What is claimed is:

1. An illumination apparatus comprising:
   an illumination optical system configured to illuminate a light modulation element;
   a plurality of light source units each including a diffusing element, at least one solid-state light source, and a light-guiding optical system configured to guide a light beam from the solid-state light source to the diffusing element; and
   an optical-path combining system configured to guide light beams from the light source units to the illumination optical system,
   wherein the optical-path combing system includes a first reflective surface on which a first light source image is formed using a light beam from a first light source unit included in the plurality of light source units and a second reflective surface where a second light source image is formed using a light beam from a second light source unit included in the plurality of light source units, and
   wherein when a plurality of predetermined regions in a region where light source images are formed by the illumination optical system using light beams from the optical-path combining system as viewed in an optical axis direction of the illumination optical system is defined as a plurality of effective regions and the number of the light source units is denoted by N, the following expression is satisfied:

$$0.7 \leq X1/Y1 \cdot Y2/X2 \leq 1.3$$

where X1 denotes a length of each of N subregions in a first side direction of the effective region, the N subregions being obtained by dividing the effective region by N along the first side direction or a second side direction orthogonal to the first side direction, Y1 denotes a length of each of the N subregions in the second side direction, X2 denotes a length of each light source image in the effective region in the first side direction, and Y2 denotes a length of the light source image in the effective region in the second side direction.

2. The illumination apparatus according to claim 1, wherein the light modulation element is a liquid crystal display element;
   the illumination optical system includes a first fly-eye lens configured to split the light beams from the optical-path combining system, a second fly-eye lens configured to receive the light beams from the first fly-eye lens, and a polarization conversion element;
   the effective region is each of a plurality of regions of the polarization conversion element where a polarization direction of light entering the polarization conversion element is converted to a predetermined polarization direction; and
   when a cross-section parallel to an optical axis of the illumination optical system and to a normal line of the diffusing element is defined as a first cross-section and a cross-section parallel to the optical axis of the illumination optical system and orthogonal to the first cross-section is defined as a second cross-section, and a compression ratio α in the first cross-section and a compression ratio β in the second cross-section are expressed as α=D2x/D1x and β=D2y/D1y, respectively, where D1x denotes a width of the first fly-eye lens in the first cross-section, D2x denotes a width of the second fly-eye lens in the first cross-section, D1y denotes a width of the first fly-eye lens in the second cross-section, and D2y denotes a width of the second fly-eye lens in the second cross-section, then an aspect ratio of the effective region is expressed either as (αX'/2)/βY' or αX'/βY'/2), where X' denotes a width of the light modulation element in the first cross-section and Y' denotes a width of the light modulation element in the second cross-section.

3. The illumination apparatus according to claim 1, wherein the light modulation element is a micromirror array including a plurality of micromirrors, each having an angle-adjustable reflective surface;
the illumination optical system includes a first fly-eye lens configured to split the light beams from the optical-path combining system, and a second fly-eye lens configured to receive the light beams from the first fly-eye lens;
the effective region is each of regions on respective lens cells of the second fly-eye lens; and
when a cross-section parallel to an optical axis of the illumination optical system and to a normal line of the diffusing element is defined as a first cross-section and a cross-section parallel to the optical axis of the illumination optical system and orthogonal to the first cross-section is defined as a second cross-section, and a compression ratio α in the first cross-section and a compression ratio β in the second cross-section are expressed as α=D2x/D1x and β=D2y/D1y, respectively, where D1x denotes a width of the first fly-eye lens in the first cross-section, D2x denotes a width of the second fly-eye lens in the first cross-section, D1y denotes a width of the first fly-eye lens in the second cross-section, and D2y denotes a width of the second fly-eye lens in the second cross-section, then an aspect ratio of the effective region is expressed as αX'/βY', where X' denotes a width of the light modulation element in the first cross-section and Y' denotes a width of the light modulation element in the second cross-section.

4. The illumination apparatus according to claim 1, wherein the light modulation element is a micromirror array including a plurality of micromirrors, each having an angle-adjustable reflective surface;
the illumination optical system includes a rod integrator; and
the effective region is a region on an incident surface of the rod integrator.

5. The illumination apparatus according to claim 1, wherein the light-guiding optical system includes a first lens surface array and a second lens surface array, the first lens surface array having a plurality of first lens surfaces configured to split the light beam from the solid-state light source, the second lens surface array having a plurality of second lens surfaces and configured to receive the light beams from the first lens surface array; and
the following expression is satisfied:

$$0.7 \leq \frac{X}{Y} \cdot \frac{y}{x} \leq 1.3$$

where X denotes a length of each of the N subregions in a short side direction, Y denotes a length of each of the N subregions in a long side direction, x denotes a length of each of the first lens surfaces in a short side direction, and y denotes a length of each of the first lens surfaces in a long side direction.

6. The illumination apparatus according to claim 5, wherein the light-guiding optical system includes
a second reflective element configured to reflect light beams from the second lens surface array and guide the light beams from the second lens surface array to the diffusing element; and
a third light-collecting optical system configured to guide light beams from the second reflective element to the diffusing element.

7. The illumination apparatus according to claim 6, wherein in a direction orthogonal to an optical axis of the third light-collecting optical system in a cross-section containing a normal line of the second reflective element and the optical axis of the third light-collecting optical system, a width of the second reflective element is smaller than a width of the third light-collecting optical system.

8. The illumination apparatus according to claim 5, wherein the at least one solid-state light source is a plurality of solid-state light sources;
the light-guiding optical system includes a mirror array configured to guide light beams from the plurality of solid-state light sources to the first lens surface array; and
a plurality of mirrors of the mirror array form parts of respective parabolic surfaces of different shapes.

9. The illumination apparatus according to claim 1, wherein the solid-state light source emits blue light or ultraviolet light; and
the diffusing element is a wavelength conversion element configured to convert part of the light beam from the solid-state light source to converted light with a wavelength different from a wavelength of the light beam from the solid-state light source.

10. The illumination apparatus according to claim 1, wherein the at least one solid-state light source is a first solid-state light source configured to emit red light, a second solid-state light source configured to emit green light, and a third solid-state light source configured to emit blue light; and
the diffusing element is a diffusing plate configured to diffuse light beams from the first solid-state light source, the second solid-state light source, and the third solid-state light source.

11. The illumination apparatus according to claim 1, wherein
the optical-path combining system includes
a first reflective element having the first reflective surface and the second reflective surface;
a first light-collecting optical system configured to form the first light source image on the first reflective surface using the light beam from the first light source unit; and
a second light-collecting optical system configured to form the second light source image on the second reflective surface using the light beam from the second light source unit.

12. The illumination apparatus according to claim 11, wherein as viewed in the optical axis direction of the illumination optical system, at least a region of up to 80% of a maximum intensity in the first light source image is located on the first reflective surface, and at least a region of up to 80% of a maximum intensity in the second light source image is located on the second reflective surface.

13. The illumination apparatus according to claim 11, wherein the following expression is satisfied:

$$0.7 \leq d1/d2 \leq 1.3$$

where, as viewed in the optical axis direction of the illumination optical system, d1 denotes a distance between centers of the first light source image and the second light source image, and d2 denotes a width of the first light source image in a direction in which the first light source image and the second light source image are arranged.

14. An illumination apparatus comprising:
an illumination optical system configured to illuminate a light modulation element;
a first light source unit including a first diffusing element, a first solid-state light source, and a first light-guiding optical system configured to guide a light beam from the first solid-state light source to the first diffusing element;
a second light source unit including a second diffusing element, a second solid-state light source, and a second light-guiding optical system configured to guide a light beam from the second solid-state light source to the second diffusing element; and
an optical-path combining system having a first reflective surface configured to reflect and guide light from the first light source unit to the illumination optical system, and a second reflective surface configured to reflect and guide light from the second light source unit to the illumination optical system,
wherein the first light source unit and the second light source unit are configured such that an image of a first spot formed on the first diffusing element by the first light-guiding optical system using the light beam from the first solid-state light source is projected toward the first reflective surface, and that an image of a second spot formed on the second diffusing element by the second light-guiding optical system using the light beam from the second solid-state light source is projected toward the second reflective surface; and
the first light-guiding optical system includes a first integrator optical system configured to uniformize a light intensity distribution in the first spot on the first diffusing element, and the second light-guiding optical system includes a second integrator optical system configured to uniformize a light intensity distribution in the second spot on the second diffusing element.

15. The illumination apparatus according to claim 14, wherein the first light source unit forms a first rectangular spot as the first spot on the first diffusing element, and the second light source unit forms a second rectangular spot as the second spot on the second diffusing element; and
an image of the first rectangular spot projected from the first light source unit toward the first reflective surface and an image of the second rectangular spot projected from the second light source unit toward the second reflective surface are arranged in a short side direction of the rectangular spots.

16. An illumination apparatus comprising:
an illumination optical system configured to illuminate a light modulation element;
a plurality of light source units each including a diffusing element, at least one solid-state light source, and a light-guiding optical system configured to guide a light beam from the solid-state light source to the diffusing element; and
an optical-path combining system configured to guide light beams from the plurality of light source units to the illumination optical system,
wherein the optical-path combing system includes a first reflective surface on which a first light source image is formed using a light beam from a first light source unit included in the plurality of light source units and a second reflective surface where a second light source image is formed using a light beam from a second light source unit included in the plurality of light source units, and
wherein when a plurality of predetermined regions in a region where light source images are formed by the illumination optical system using the light beams from the optical-path combining system as viewed in an optical axis direction of the illumination optical system is defined as a plurality of effective regions and the number of the plurality of light source units is denoted by N, a long side direction of N subregions obtained by dividing the effective region by N along a first side direction of the effective region or a second side direction orthogonal to the first side direction is parallel to a long side direction of each light source image in the effective region.

17. A projection display apparatus comprising:
an illumination apparatus;
a light modulation element including a first color light modulation element, a second color light modulation element, and a third color light modulation element for light of different colors; and
a color separating-combining system configured to guide a light beam from the illumination apparatus to the first color light modulation element, the second color light modulation element, and the third color light modulation element and receive a light beam from the first color light modulation element, a light beam from the second color light modulation element, and a light beam from the third color light modulation element,
wherein the illumination apparatus includes
an illumination optical system configured to illuminate the light modulation element;
a plurality of light source units each including a diffusing element, at least one solid-state light source, and a light-guiding optical system configured to guide a light beam from the solid-state light source to the diffusing element; and
an optical-path combining system configured to guide light beams from the plurality of light source units to the illumination optical system,
wherein the optical-path combing system includes a first reflective surface on which a first light source image is formed using a light beam from a first light source unit included in the plurality of light source units and a second reflective surface where a second light source image is formed using a light beam from a second light source unit included in the plurality of light source units, and
wherein when a plurality of predetermined regions in an area where light source images are formed by the illumination optical system using the light beams from the optical-path combining system as viewed in an optical axis direction of the illumination optical system is defined as a plurality of effective regions and the number of the plurality of light source units is denoted by N, the following expression is satisfied:

$$0.7 \leq X1/Y1 \cdot Y2/X2 \leq 1.3$$

where X1 denotes a length of each of N subregions in a first side direction of the effective region, the N subregions being obtained by dividing the effective region by N along the first side direction or a second side direction orthogonal to the first side direction, Y1 denotes a length of each of the N subregions in the second side direction, X2 denotes a length of each light source image in the effective region in the first side direction, and Y2 denotes a length of the light source image in the effective region in the second side direction.

18. The projection display apparatus according to claim 17, further comprising a projection optical system configured to guide a light beam from the color separating-combining system to a projection surface.

19. A projection display apparatus comprising:
an illumination apparatus;
a light modulation element including a first color light modulation element, a second color light modulation element, and a third color light modulation element for light of different colors; and
a color separating-combining system configured to guide a light beam from the illumination apparatus to the first color light modulation element, the second color light modulation element, and the third color light modulation element and receive a light beam from the first color light modulation element, a light beam from the second color light modulation element, and a light beam from the third color light modulation element,
wherein the illumination apparatus includes
an illumination optical system configured to illuminate the light modulation element;
a first light source unit including a first diffusing element, a first solid-state light source, and a first light-guiding optical system configured to guide a light beam from the first solid-state light source to the first diffusing element;
a second light source unit including a second diffusing element, a second solid-state light source, and a second light-guiding optical system configured to guide a light beam from the second solid-state light source to the second diffusing element; and
an optical-path combining system having a first reflective surface configured to reflect and guide light from the first light source unit to the illumination optical system, and a second reflective surface configured to reflect and guide light from the second light source unit to the illumination optical system,
wherein the first light source unit and the second light source unit are configured such that an image of a first spot formed on the first diffusing element by the first light-guiding optical system using the light beam from the first solid-state light source is projected toward the first reflective surface, and that an image of a second spot formed on the second diffusing element by the second light-guiding optical system using the light beam from the second solid-state light source is projected toward the second reflective surface; and the first light-guiding optical system includes a first integrator optical system configured to uniformize a light intensity distribution in the first spot on the first diffusing element, and the second light-guiding optical system includes a second integrator optical system configured to uniformize a light intensity distribution in the second spot on the second diffusing element.

20. A projection display apparatus comprising:
an illumination apparatus;
a light modulation element including a first color light modulation element, a second color light modulation element, and a third color light modulation element for light of different colors; and
a color separating-combining system configured to guide a light beam from the illumination apparatus to the first color light modulation element, the second color light modulation element, and the third color light modulation element and receive a light beam from the first color light modulation element, a light beam from the second color light modulation element, and a light beam from the third color light modulation element,
wherein the illumination apparatus includes
an illumination optical system configured to illuminate the light modulation element;
a plurality of light source units each including a diffusing element, at least one solid-state light source, and a light-guiding optical system configured to guide a light beam from the solid-state light source to the diffusing element; and
an optical-path combining system configured to guide light beams from the plurality of light source units to the illumination optical system,
wherein the optical-path combing system includes a first reflective surface on which a first light source image is formed using a light beam from a first light source unit included in the plurality of light source units and a second reflective surface where a second light source image is formed using a light beam from a second light source unit included in the plurality of light source units, and
wherein when a plurality of predetermined regions in an area where light source images are formed by the illumination optical system using the light beams from the optical-path combining system as viewed in an optical axis direction of the illumination optical system is defined as a plurality of effective regions and the number of the plurality of light source units is denoted by N, a long side direction of N subregions obtained by dividing the effective region by N along a first side direction of the effective region or a second side direction orthogonal to the first side direction is parallel to a long side direction of each light source image in the effective region.

* * * * *